United States Patent [19]

Becker

[11] Patent Number: 5,015,385

[45] Date of Patent: May 14, 1991

[54] PROCESS FOR PROMOTION OF MICROBIAL CONSUMPTION OF WASTE WATER FATS

[75] Inventor: Klaus Becker, Hamburg, Fed. Rep. of Germany

[73] Assignee: BTC Biotechnik International GmbH, Hamburg, Fed. Rep. of Germany

[21] Appl. No.: 434,770

[22] Filed: Nov. 13, 1989

Related U.S. Application Data

[62] Division of Ser. No. 25,558, Mar. 13, 1987, abandoned.

[30] Foreign Application Priority Data

Mar. 13, 1986 [DE] Fed. Rep. of Germany ....... 3608422

[51] Int. Cl.$^5$ ............................ C02F 3/00; C02F 9/00; C11C 1/00
[52] U.S. Cl. ................................ 210/610; 210/631; 435/271
[58] Field of Search ................. 210/610, 749; 422/14; 435/271

[56] References Cited

U.S. PATENT DOCUMENTS 3,959,127 5/1976 Bartha .................................. 210/11
4,680,889 7/1987 Carlson .

FOREIGN PATENT DOCUMENTS 0245560 11/1987 European Pat. Off. .

OTHER PUBLICATIONS

Brock, T., Biology of Microorganisms, pp. 131–133, 144–145, 165–167, (1979).
Laskin et al. (eds), CRC Handbook of Microbiology, vol. IV, pp. 2–19, 1974.
Davis et al. (eds), Microbiology, Chapter 5 (Bacterial Nutrition and Growth), pp. 90–104, (2nd Edition), 1973.
Stanek et al., Folia Microbiol., vol. 28 (1983), pp. 91–99.
Suslow et al., The American Phytopathological Society, vol. 72, No. 1, 1982, pp. 111–115.
Lockhead et al., Canadian Journal of Microbiology, vol. 3, 1957, pp. 35–42.
German document–Archiv. Fur Mikrobiologie, 50, 293–320 (1965) Balazs et al.
German document (with summary translation)–Zentralblatt fur Bakleriologie, Abt II, Band 115, pp. 223–239 (1967).

*Primary Examiner*—Johnnie R. Brown
*Assistant Examiner*—L. Eric Crane
*Attorney, Agent, or Firm*—Cushman, Darby & Cushman

[57] ABSTRACT

The composition of stable microbial mixed biocenoses can be controlled by the addition of growth factors and/or inhibitory substances, optionally together with certain nutrients. It is possible in this manner to suppress, e.g. the undesirable formation of bulking sludge in sewage treatment plants or to improve the digestion of food or fodder containing biopolymers in the intestine or rumen.

5 Claims, No Drawings

PROCESS FOR PROMOTION OF MICROBIAL CONSUMPTION OF WASTE WATER FATS

This is a division of application Ser. No. 025,558, filed Mar. 13, 1987, now abandoned.

The present invention relates to a method of controlling the composition of a stable microbial mixed biocenosis.

BACKGROUND OF THE INVENTION

Almost all microbial conversions in nature take place by means of microbial mixed biocenoses (a mixed biocenosis is the symbiosis of different microorganisms). Also, many industrial biological processes, e.g., the biological purification of waste water or the production of sourdough are based on the metabolism of microbial mixed biocenoses. It is known that mixed biocenoses develop over a very long period of time, in comparison to the generation time of the individual species, to very mature and stable biocenoses in which the organizational level, which can be expressed, for example, as the ratio of biomass to productivity, is high. This is particularly true for biocenoses whose environmental conditions remain relative constant, as is the case in the intestine of warm blooded animals. Stable biocenoses generally exhibit a plurality of control mechanisms which buffer changes of external conditions. Species spectrum and population of individuals of a biocenosis oscillate in their climax stage about an optimum point. If, for example, the amount of nutrients increases, essentially only the most populous allochthonous microorganisms will multiply temporarily while the highly specialized autochthonous ones remain almost constant. These autochthonous microorganisms have frequently become so specialized that they require growth factors, (sometimes called supplies) in order to live.

Growth factors are substances which are associated with the basic constituents of the cell and which can not be synthesized by individual organisms from the simple building blocks. They are amino acids, purines, pyrimidines, organic acids, carbohydrates and vitamins (See Starr, M. P., Stolp, H, Truper, H. G., Boleros, A and Schliegel, H. G., Eds: The Prokaryotes: A Handbook on Habits, Isolation and Identification of Bacteria, Springer, N.Y., 1981; Davis, B. D., Dulbecco, R., Eisen, H. N., Ginsberg, H. S., Wood, B.: Microbiology, Harper Int. Ed. N.Y., 6th Ed. 1970). Carbohydrates can be both nutrients and growth factors. Carbohydrates which occur particularly infrequently can often be considered as growth factors. Growth factors differ distinctly from nutrients as regards their function and concentration. They correspond to vitamins in animal and human nourishment. Frequently, final or intermediary products of the metabolism of one species in microbial mixed biocenoses serve as growth factors for another species, which results in a control mechanism (c.f. Schlegel, "Allgemeine Microbiologie", 5th edition, 1981, Stuttgart, Verlag Thieme, page 169). Another control mechanism consists in that the individual members of a microbial biocenosis react with different sensitivities to inhibitory substances stemming either from other members of the microbial biocenosis or also from a higher symbiotic partner, e.g. a host plant.

In biocenoses, the individual functions are exercised by certain members of this biocenosis which thus fill a certain ecological niche. As a rule, the same ecological niche can be filled by several species. It has been found that in microbial mixed biocenoses, individual bacterial species with positive qualities can be purposefully stimulated and/or individual members with certain negative qualities can be purposefully suppressed if use is made of the fact that many autochthonous bacterial species of stable microbial mixed biocenoses exhibit a different sensitivity to growth factors and/or to biotic inhibitory substances.

Frequently, growth factors of one species can have an inhibiting action in certain concentrations on other species. The same growth factor can both inhibit and stimulate the same species.

SUMMARY OF THE INVENTION

The invention therefore relates to stable microbial mixed biocenoses. The object of the invention is filling one or several ecological niches which are occupied with one or several undesired bacterial species with one or several desirable bacterial species whose ecological potency corresponds entirely or largely to that of the undesirable bacterial species.

This objective is achieved by the following method: One or several undesirable species of microorganisms in one or several ecological niches of this type of biocenosis are replaced by one or several desirable species of microorganisms by adding growth factors for the desired species and/or inhibitory substances for the undesired species.

In the process of the present invention, the stability of the biocenosis is unchanged or changed to only an insubstantial degree, which is an important advantage of the method of the invention over the addition of probiotics, i.e., artificially cultured, desirable microorganisms.

The addition of certain suitable nutrients at the same time as or at a different time than the addition of growth factors and/or inhibitory substances makes possible an increase of the autochthonous microorganisms. Growth factors and/or inhibitory substances are factored into this growth rise. This makes it possible to fill ecological niches with desired organisms.

If the nutrients are already present, e.g. in sewage sludges and in human and animal food, a separate addition of nutrients for microorganisms is not necessary.

Thus, for example, the generation or increase of bulking sludge can be suppressed by the addition of growth factors and/or inhibitory substances to the activated sludges of sewage treatment plants in accordance with the method of the invention.

In biological sewage treatment plants (activated sludge systems), the purification of sewage water is performed by a microbial mixed biocenosis in the form of activated sludge flocculi. Threadlike microorganisms (bacteria and fungi) occur relatively frequently which result, after a certain relative concentration is reached, in bulking sludge which is difficult to coagulate. Bulking sludge bacteria and fungi differ from the flocculi-forming microorganisms in having different requirements for growth factors, such as, e.g., amino acids, purines, pyrimidines and vitamins. The species spectrum can be varied so that the thread-forming bacteria are repressed in relation to the flocculi-forming ones by means of suitable additions in accordance with the invention.

Other examples for applications of the method of the invention are the control of fermentations in milk products, especially in the ripening of cheeses, and the souring of sausages (salami, cervelat).

Another example of the application of the method of the invention is the purification of waste pipes for fatty waste water from a household or from industrial establishments, whereby the formation of a plug in the waste pipe can be prevented, or, if such a plug has already formed, it can be readily broken up by the addition of growth factors for bacteria which break down or emulsify fat.

Growth factors, inhibitory substances and nutrients for clostridia and lactic acid formers (Lactobacteriaceae) are known, even if not completely. Thus, amino acids, purines, pyrimidines and vitamins are growth factors for bacteria of the genus clostridia and for Lactobacteriaceae species.

There is a series of inhibitory substances (antibiotics) both against clostridia and also against Lactobacteriaceae, for which the sensitivity of the individual species and also of the subspecies is variable. Many inhibitory substances which play a part in microbial mixed biocenoses have not yet been chemically identified.

The following compounds are known as nutrients, which differ basically from growth factors, both for Lactobacteriaceae and for clostridia: ammonium ions, nitrate ions, phosphate ions, glucose, etc. Polysaccharides and proteins are to be especially cited as nutrients for clostridia and carbohydrates for Lactobacteriaceae.

The invention is explained in more detail below in several specific embodiments. However, it is not intended to limit the scope of the invention to these embodiments.

EXAMPLE 1

Reduction of Bulking Sludge in Sewage Treatment Plants

Extremely heavy formation of bulking sludge occurred in a sewage treatment plant due to the bacteria species type 021N and Microthrix paravicella. The formation of bulking sludge was halted within 36 hours by the addition of a mixture of vitamin $B_{12}$, thiamine and 2-aminobenzoic acid in a weight ratio of 1:1:2 mixed and in an amount of 0.5 g (mixture)/kg $BSB_5$ (biochemical oxygen requirement in five days). The bulking sludge did not reoccur until after the addition of growth factors had been halted.

EXAMPLE 2

Breakdown of the Plug in Waste Pipes

Fat, together with hair and other refuse, frequently forms plugs in the waste pipes of households and industrial plants. These plugs can be broken down by dissolving out the fat. This is done conventionally by saponifying the fat, e.g. with potash lye or sodium hydroxide solution or by emulsifying the fat with detergents. The saponification can also be coupled with an emulsification. This known manner of pipe cleaning has, however, considerable disadvantages. When potash lye or sodium hydroxide solution is used for saponification, materials sensitive to lye are attacked, which can result in a destruction of the waste lines if they are not completely lye-proof. The great excess of lye destroys the microflora in the receiving water or in the sewage treatment plant, which can cause considerable problems.

Emulsification with detergents is only slightly effective, so that it requires a very long time. Moreover, a great amount of chemicals is also required in this instance, which puts a heavy load on the receiving water and, down the line, on sewage treatment plants.

According to the present invention, a biological breakdown of the fat is achieved by means of the bacteria present in the waste water. Growth factor combinations for stimulating the bacteria which break down (or emulsify) fat are put alone, or in combination with a detergent, onto the plug in the waste pipe and subsequently dissolved in water. The growth factor combination makes possible a rapid growth of the desired bacteria, which results in a dissolving of the troublesome fat plug.

The bacteria which break down or emulsify fat comprise a broad spectrum of gram-negative bacteria, usually pseudomonads, which are normally contained in the waste water itself.

A detergent can be added in order to aid the penetration of the growth factors into the fat plug. The same purpose is served by the addition, either alone or in combination with the detergent, of a powder which develops $CO_2$, e.g. effervescent powder consisting of approximately 50% by weight sodium hydrogen carbonate and approximately 50% by weight tartaric acid.

A growth factor combination of
30 mg phenylalanine
30 mg arginine
30 mg asparaginic acid
30 mg oxalic acid
30 mg malic acid
30 mg malonic acid
30 mg propionic acid,
to which 3 g sodium dodecylsulfate is added as detergent and an effervescent powder of 5 g sodium hydrogen carbonate and 5 g tartaric acid as an agent which develops $CO_2$, which consists of a total mixture of 13.21 g, corresponding to the volume of a teaspoon, is mixed with 900 ml water and 100 ml of a soil suspension (as bacteria source) and added in a beaker glass to a cylindrical specimen (diameter 32 mm, length 29 mm, weight 17 g) of the following components:
27% by wt. water
3% by wt. hair
10% by wt. palmine (coconut butter)
17% by wt. hog fat
20% by wt. coffee grounds
5% by wt. tea leaves.

The growth factor combination containing a detergent and effervescent powder was added at 15° C. to the cylindrical specimen (fat plug) in a beaker glass. After 30 to 45 minutes, the specimen has been affected so strongly that it breaks up under vigorous agitation or when rinsed with water (simulation of the flushing impact in a waste water line).

REFERENCE EXAMPLE 1

In the manner described in Example 2, an artificial fat plug is compounded in a beaker glass with a mixture of 3 g sodium dodecylsulfate as detergent and 5 g sodium hydrogen carbonate and 5 g malic acid (=10 g effervescent powder) as a powder which develops $CO_2$. The fat plug is attacked only slightly without the growth factor combination, so that it does not break up even after two hours, even when vigorously agitated or when rinsed with water.

REFERENCE EXAMPLE 2

In the manner described in Example 2, a fat plug is treated in a beaker glass, but no soil suspension (as bacteria source) is added. The growth factor combination used in Example 2, to which 3 g sodium dodecylsulfate is added as detergent and 10 g effervescent powder as agent which develops CO$_2$, exhibits only a slight effect on the fat plug. Thus, the plug cannot be broken up even after two hours under vigorous agitation or when rinsed with water.

EXAMPLE 3

A growth factor combination of the following components:
- 0.5 mg tyrosine
- 0.5 mg phenylalanine
- 0.5 mg tryptophane
- 0.5 mg glutaminic acid
- 0.5 mg arginine
- 0.5 mg proline
- 0.5 mg oxalic acid
- 0.5 mg malic acid
- 0.5 mg succinic acid
- 0.5 mg malonic acid
- 0.5 mg propionic acid
- 0.5 mg fumaric acid
- 0.5 mg ketoglutaric acid
- 0.5 mg nicotinic acid
- 0.5 mg glutaric acid is dissolved with 900 ml water and compounded with 100 ml soil suspension. This mixture is added in a beaker glass to a cylindrical specimen which exhibits the composition and dimensions given in Example 2. Although no detergent and no agent developing CO$_2$ is added, the fat plug breaks up after approximately 90 minutes under vigorous agitation of the mixture.

EXAMPLE 4

A mixture of 15 mg phenylalanine
- 15 mg arginine
- 15 mg asparaginic acid
- 15 mg oxalic acid
- 15 mg malic acid
- 15 mg malonic acid
- 15 mg propionic acid
- 1 mg LACOBIOS[1]

[1] Product of the firm Probios Biotechnolgie GmbH, D-8490 Cham, West Germany, containing composted seaweed (Ascophyllum nodosum and Laminaria digitata) - contains alginates.

- 2 mg phonolite stone dust
- 1.5 mg magnesium heptahydrate
- 1 g Biosol[2]

[2] Product of the firm Biochemie GmbH, A6250 Kundl, West Germany, distributed in the Federal Republic of Germany by Gebr. Friedrich, D-33210 Saltzgitter, West Germany as well as 3 g sodium dodecylsulfate as detergent and
  5 g sodium hydrogen carbonate and 5 g tartaric acid as effervescent powder is dissolved in 900 ml water in a beaker glass and compounded with 100 ml soil suspension (as a source for microorganisms which break up or emulsify fat). The addition to the specimen (fat plug) is performed at 15° C. as in Example 2, which specimen is so heavily attacked that it breaks up under vigorous agitation.

What is claimed is:

1. A process of purifying household or industrial establishment waste water pipes containing fatty waste water, which method comprises adding to the fatty waste water a growth factor which enhances the growth of bacteria contained in the waste water which break up or emulsify fat in an amount sufficient to effect the bacterial growth enhancement but insufficient to serve as a significant nutrient source for the bacteria.

2. The process according to claim 1 wherein said growth factor comprises an amino acid and a carboxylic acid.

3. The process according to claim 2 wherein said growth factor comprises a mixture of phenylalanine, arginine, asparaginic acid, oxalic acid, malic acid, malonic acid and propionic acid.

4. The process according to claim 1 further comprising adding to the waste water a detergent or an agent that develops CO$_2$.

5. The process according to claim 1 further comprising adding to the waste water a detergent and an agent that develops CO$_2$.

* * * * *